R. D. SMITH.
COUPON PASSENGER TICKET.
APPLICATION FILED DEC. 2, 1909.

986,095.

Patented Mar. 7, 1911.

UNITED STATES PATENT OFFICE.

ROY D. SMITH, OF LOS ANGELES, CALIFORNIA.

COUPON PASSENGER-TICKET.

986,095.  Specification of Letters Patent.   Patented Mar. 7, 1911.

Application filed December 2, 1909. Serial No. 531,099.

*To all whom it may concern:*

Be it known that I, ROY D. SMITH, a citizen of the United States, residing at Los Angeles, in the county of Los Angeles and State of California, have invented a new and useful Coupon Passenger-Ticket, of which the following is a specification.

One of the objects of my invention is to provide a one form coupon ticket for use over a route of travel, comprising a number of different lines of railways, which will be simple in its arrangement and at the same time designate upon each coupon all of the roads over which the passenger is going, or over which the ticket was purchased, and designate the particular road of the several roads having the same junction points over which the ticket is good.

The principal object of my invention is to provide a coupon railroad ticket covering a route of travel over a series or system of railroads, each coupon being provided with the names of all of the roads in the route which have the same junction points or terminal, arranged in groups thereon, such groups of names being arranged in progressive order across each of the several coupons to thereby show in such groupings the railroads which have the same junctions or terminal in their sequential order with relation to the route traversed.

A further object of my invention is to provide a coupon railroad ticket having groupings of the names of railroads having common junctions or terminal points arranged in progressive order upon each coupon, and means for indicating the common junction or terminal of such roads in conjunction with such groupings of the railroad names.

My invention is specially adapted to allow the passenger to select any particular railroad over which he desires to travel between terminal points or junctions and enables the ticket agent to place the same in a valid condition in a short time, by means of an ordinary six hole punch.

I am aware that heretofore coupon tickets have been used in which all of the names of the railroads, over which the several coupons to be used, are valid, and I am aware that such coupons have been provided with emphasized spaces upon each coupon to indicate and call attention to the road over which the coupon is valid, and I am also aware that a coupon ticket having a plurality of coupons bearing upon each one arrangements of combinations of different railroads to constitute a particular route of journey has been used.

By my invention I am enabled to make a multiplicity of combinations covering any route desired by the passenger, all of which combinations and arrangements may be contained upon a small coupon together with all information necessary or customary to be furnished thereupon.

The accompanying drawings illustrate my invention.

Figure 1 is a view showing the agent's stub coupon and two of the first coupons to be used upon the journey. Fig. 2 is a view in outline showing a complete ticket of four coupons, the agent's stub and the advice to auditor stub. Fig. 3 is a view of the ticket folded ready for punching to validate the same.

1 indicates the first coupon to be used upon a journey, while 2, 3 and 4 indicate the succeeding coupons to be used in their sequential order upon roads having common terminals or junction points.

5 indicates the agent's stub coupon which is to be retained by the agent as a record of the transaction of the sale of the ticket to the passenger.

6 is the auditor's stub coupon which is used by him in settling accounts between the selling road and the railroads over which the passenger is carried.

In the ticket illustrated in the drawings, the starting point is shown by stamping the name of the station selling the same upon the back of each of the coupons. The terminal or junction point to which the ticket is sold is named in one of the spaces shown under the title, "Destination" 7. The several points which may be reached from any one point by any line of railway or any connecting railway are grouped in columns under such heading in any suitable or convenient manner.

The main or central portion of the several coupons is provided with a plurality of columns or spaces 8, 9, 10 and 11 suitably divided, in each of which spaces are arranged the names of all railroads having a common starting point and a common terminal, together with the names of the common starting point and terminal of such roads. The group of roads embraced in the column of the coupon which is valid between any two points is embraced in an emphasized border or marking 12 which makes such column quickly distinguishable from the other columns containing groups of railroads and junctions not having the junction point or terminal stated as the points to which the coupon is good. The railroad over which the coupon will be honored for passage is indicated by the ordinary punch marks above and below the name of the road.

The columns inclosed in the emphasized lines 12 are arranged in progressive order in stepped relation to each other upon each coupon and may be utilized by the auditors in tracing or proving the progress of a passenger upon his journey as well as serving to guide the conductor or ticket taker to locate upon the ticket the information as to whether or not the coupon presented to him is the one issued for the road over which the passenger is entitled to travel.

As illustrating the application of my invention to a railroad ticket, I have shown a coupon ticket in the accompanying drawings having four groups of names of railroads, which are connected through junction points or terminals to form a route of travel from the initial or starting point which is the station which is to be stamped on the back of the ticket, which information or direction is printed at the head of column 1 and reads "Station on back via". The road over which passage will be honored for coupon 1 is "North & South Ry", as shown in column 1, and the station or junction to which the coupon is good is "To Denver", as shown printed at the bottom of column 1. Such column on coupon 1 is embraced in an emphasized border.

"Column 2" reads, "From Denver via", at the head of such column, over either the "Mo. Pacific Ry., Union Pacific Ry., C. R. I. & P. Ry., Burlington or A. T. & S. F. Ry." railroads "To Co. Bluffs", named at the bottom of the column. As shown, the "Burlington" has been selected as the road over which the second coupon is to be good and that road has been indicated by the embracing punch marks. Column 2 on coupon 2 is embraced within an emphasized border showing that the roads only within such border are available for passage by the use of that coupon.

Column 3 reads from "Co. Bluff via" the roads "C. M. & S. P. Ry., Wabash Ry., Union Pacific Ry., Mo. Pacific Ry., or C. R. L. & P. Ry., to Kan. City". The "Union Pacific Ry." having been selected, that name is indicated by the embracing punch marks. Such column 3 is embraced in an emphasized border or marking upon coupon 3, and shows such group of roads on such coupon 3 to be the roads over which such coupon may be used.

Column 4 reads "From Kan. City via", the roads "Wabash Ry., C. G. Western Ry., A. T. & S. F. Ry., C. R. I. & P. Ry., C. M. & S. P. Ry., or Chicago & Alton Ry." to "Destination", at the bottom of the column, which gives reference to the groups of printed names of stations collected under the heading "Destination", or which station may be written in the blank space 17. The names of the railroads grouped together in column 4 on coupon 4 are inclosed in an emphasized border to show that one of the roads named in that column on that coupon will honor such coupon for passage when the name of such road is indicated. Such indication is illustrated on the ticket by embracing punch marks.

The ticket is folded along the dotted lines 13 between the coupons before the ticket is punched to bring the names of the roads opposite to each reoccurrence on the several tickets, the arrangement of the names being reversed upon each alternate ticket in order to cause such names on the several coupons to register with each other when the ticket is folded, as shown in Fig. 3. When the ticket is thus folded one punching operation for each column makes the ticket valid over the route selected and such selection is shown on each coupon.

The railroads traveled over by the passenger in the course of the journey are shown by the punch marks 14 across each coupon, and the road upon which each coupon is valid is inclosed in and is indicated by the bordered space 12, thus giving to all who inspect the same full information as to the route traveled.

The names of any two points between which a coupon may be valid may be used in the space 18 at the head of each coupon and I prefer to use the same to indicate the starting and ending point of each coupon. The station from which the coupon is valid to the next junction point or station is also included in the group of railroads running between these two points. I preferably print the name of the starting point above such group as in space 15, 15 and the terminal station of such group of roads in the spaces 16, 16, so that all information in regard to roads going from one point to another as well as the names of the two different points between which the roads run are shown in connection with the names of the roads. Each coupon is also provided with the customary spaces for punching to indicate the class of ticket, whether baggage is carried thereon and for the different conductors or agents of the lines traversed.

By grouping all of the railroads having common terminal or junction points in separate columns, and arranging the columns in the manner disclosed, I am enabled to make up a one form ticket with a multiplicity of routes. In the form shown in the accompanying drawings, I am enabled to route a passenger from Los Angeles to one of the eastern points named over one hundred and twenty-five different combinations of railroad lines, and by the addition of more columns of roads and other destinations an unlimited number of combinations can be made.

I herein use the term "junction point" as including the point at which a transfer either of the train from one railroad to another, or the transfer of the passenger from the train of one road to another, is required to carry such passenger from one point to another, whether such point be the terminus of the railroad or simply a junction or divisional point. I employ "terminal" herein as being the final destination of a coupon good over a road over which the ticket is sold.

What I claim is:—

1. A coupon ticket comprising a plurality of coupons, each coupon having a plurality of groups of names of railroads printed thereon in the same successive order, each group of names of railroads comprising the names of railroads having a common starting point and a common ending or junction point, the ending or junction point of one group of names of roads being the common starting point of the succeeding group of roads; one group of such plurality of groups of names of roads on each coupon having an emphasized border marking around such group, such emphasized borders being arranged progressively on the several coupons of the ticket in stepped relation to each other, in the order of their use.

2. A coupon ticket comprising a plurality of coupons, each coupon having a plurality of groups of names of railroads printed thereon, the groups on each coupon reoccurring in the same relative position so that when the coupons are brought together these respective columns lie in superposed position with one another, each group of names of railroads having the name of a starting station common to all of the roads whose names appear in such group arranged at the head of such group and the name of an ending or junction point common to all such railroads arranged at the bottom of such group; the name of the ending or junction point of one group being the starting point of the railroads whose names appear in the next succeeding group of names of railroads.

3. A coupon ticket having the names of railroads having common junction points grouped together in separate columns, the name of the common terminal or junction point of each group arranged in conjunction therewith, such columns of groupings being arranged on the several coupons in the progressive order of the junction points or terminals, and an emphasized border around the particular column designating the railroads between the points covered by the given coupon, such borders being arranged in the progressive order of the coupons.

4. A coupon ticket comprising a plurality of coupons, a plurality of groups of names of railroads on each of such coupons, each group of railroads comprising the names of roads having a common starting and ending station, the names of the common starting and ending stations arranged in conjunction with the group of names of roads common thereto, the ending station of the initial railroad being the starting station of the railroad named in the next succeeding group over which the ticket is valid, and an emphasized border or marking around one of such groups of names of railroads on each coupon, such groups of names and emphasized borders therearound being arranged on the several coupons in stepped relation to each other in the advancing order of the coupons.

5. A coupon ticket having a plurality of coupons arranged and adapted for successive detachment, each coupon having a plurality of columns of names of railroads and junction points arranged in progressive order corresponding to the successive order of the several coupons, the starting point of a succeeding coupon being the destination point of the preceding coupon; the columns and names upon a coupon which correspond with the successive order of the coupon upon which it is placed being provided with an emphasized border to thereby indicate that a railroad named in such column will honor such coupon for passage between the junction and terminal points named therein.

In testimony whereof, I have hereunto set my hand at Los Angeles, Cal., this 26th day of November, 1909.

ROY D. SMITH.

In presence of—
F. M. TOWNSEND,
FRANK L. A. GRAHAM.